United States Patent
Rompage et al.

(10) Patent No.: US 10,773,757 B2
(45) Date of Patent: Sep. 15, 2020

(54) VEHICLE BODY ASSEMBLY

(71) Applicant: Honda Motor Co., Ltd., Tokyo (JP)

(72) Inventors: Adam J. Rompage, Dublin, OH (US); Edward W. Bach, Marysville, OH (US); Kevin D. Helton, Marysville, OH (US); Steven U. Behm, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 16/168,022

(22) Filed: Oct. 23, 2018

(65) Prior Publication Data
US 2019/0054960 A1 Feb. 21, 2019

Related U.S. Application Data

(62) Division of application No. 15/383,438, filed on Dec. 19, 2016, now Pat. No. 10,137,943.

(60) Provisional application No. 62/276,497, filed on Jan. 8, 2016.

(51) Int. Cl.
B05D 7/14 (2006.01)
B62D 33/023 (2006.01)
B60J 10/00 (2016.01)
B62D 25/16 (2006.01)
B62D 65/02 (2006.01)
B05D 1/00 (2006.01)

(52) U.S. Cl.
CPC .......... *B62D 33/023* (2013.01); *B05D 1/007* (2013.01); *B05D 7/14* (2013.01); *B60J 10/00* (2013.01); *B60J 10/45* (2016.02); *B62D 25/16* (2013.01); *B62D 65/024* (2013.01)

(58) Field of Classification Search
CPC . B60J 10/00; B60J 10/30; B60J 10/45; B62D 25/02; B62D 25/16; B62D 33/023; B62D 65/024; B62D 25/023; B05D 1/007; B05D 1/18; B05D 7/14; B05D 7/142
USPC ........................................................ 296/198
See application file for complete search history.

(56) References Cited

U.S. PATENT DOCUMENTS

| | | | |
|---|---|---|---|
| 3,586,119 A | 6/1971 | Chuchua et al. | |
| 3,638,991 A | 2/1972 | Hathaway, Jr. | |
| 3,897,970 A | 8/1975 | Gattenby | |
| 4,123,099 A | 10/1978 | Mashigan | |

(Continued)

OTHER PUBLICATIONS

Niedermeyer, Paul, "Curbside Classic: 1962 Ford Styleside F-100 Pickup—That Most Feminine Truck", Curbside Classic Website, Feb. 17, 2015, 25 pages, http://www.curbsideclassic.com/curbside-classics-american/curbside-classic-1962-ford-styleside-f-100-pickup-that-most-feminine-truck/.

(Continued)

*Primary Examiner* — Jason S Daniels
(74) *Attorney, Agent, or Firm* — Mark E. Duell; Rankin, Hill & Clark LLP

(57) ABSTRACT

A vehicle body assembly includes a frame having a forward frame part defining a passenger cabin and a rear frame part defining a load carrying bed. A separate rear fender is removably fastened to the rear frame part, wherein a gap is provided between the forward frame part and the rear fender. A separate rear fender fairing is mounted to an inside surface of the rear fender. The rear fender fairing includes a seal located in the gap and sealingly engaging both the forward frame part and the rear fender.

17 Claims, 12 Drawing Sheets

(56) References Cited

U.S. PATENT DOCUMENTS

| | | |
|---|---|---|
| 4,627,655 A | 12/1986 | Collins |
| 4,842,326 A | 6/1989 | DiVito |
| 5,018,779 A | 5/1991 | Lund |
| 5,090,765 A | 2/1992 | Gremillion |
| 5,280,984 A | 1/1994 | Paul et al. |
| 5,516,185 A | 5/1996 | O'Donnell et al. |
| 5,784,769 A | 7/1998 | Clare |
| 6,126,229 A | 10/2000 | Lund |
| 6,142,549 A | 11/2000 | Clare et al. |
| 6,267,434 B1 | 7/2001 | Casillas |
| 6,485,077 B1 | 11/2002 | Foster et al. |
| 6,648,400 B2 | 11/2003 | Takahashi et al. |
| 6,986,540 B2 | 1/2006 | Augustine et al. |
| 7,665,800 B2 | 2/2010 | Werner |
| 7,669,800 B2 | 3/2010 | Hernandez |
| 7,815,147 B2 | 10/2010 | Hernandez |
| 7,819,463 B2 | 10/2010 | Werner |
| 9,126,535 B1 | 9/2015 | Moore |
| 9,278,716 B1 | 3/2016 | Joseph et al. |
| 2005/0052045 A1 | 3/2005 | Juzwiak |
| 2007/0046056 A1 | 3/2007 | Delaney et al. |
| 2007/0085381 A1 | 4/2007 | Delaney et al. |
| 2008/0197614 A1 | 8/2008 | Connors et al. |
| 2008/0258498 A1* | 10/2008 | Philip ................ B62D 33/023 296/182.1 |
| 2011/0080017 A1 | 4/2011 | Olson |
| 2015/0130224 A1 | 5/2015 | Donabedian et al. |
| 2016/0059901 A1* | 3/2016 | Joseph ................ B62D 25/18 296/198 |

OTHER PUBLICATIONS

"Truck Bed to Cab Molding Together", from website: The Ranger Station, 5 pages, http://www.therangerstation.com/forums/showthread.php?t=54399.

Notice of Allowance of U.S. Appl. No. 15/383,438; dated Jul. 25, 2018; 17 pages.

\* cited by examiner

Section CC

Section DD

Section EE

Section FF

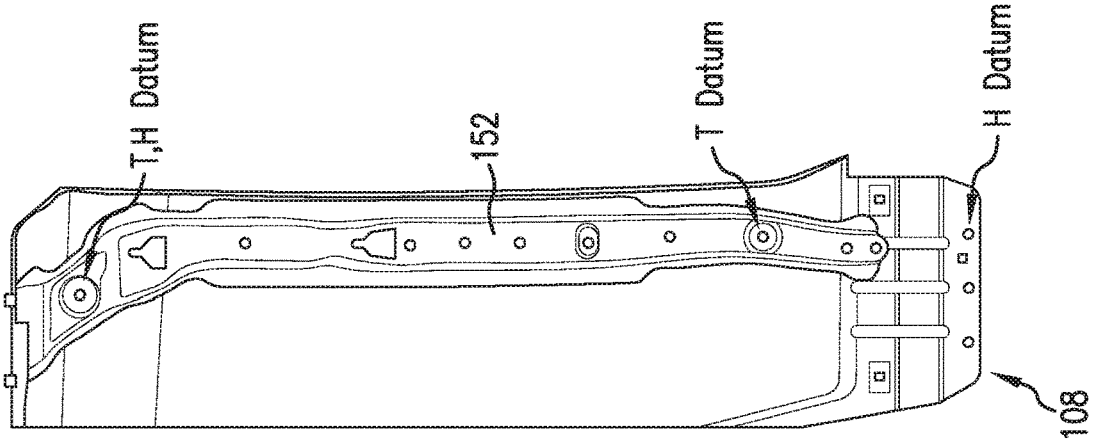
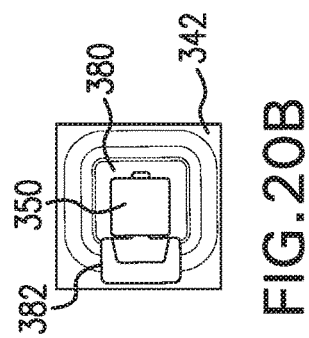
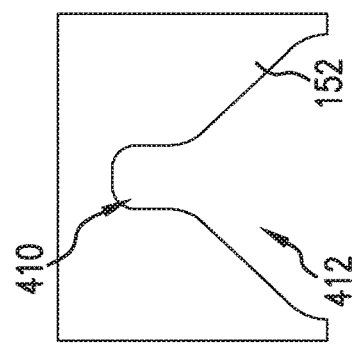
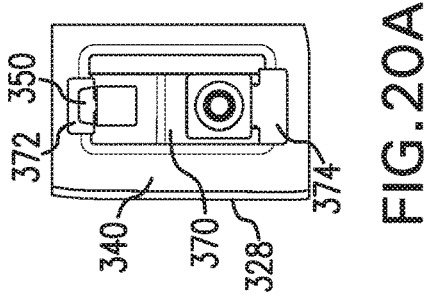
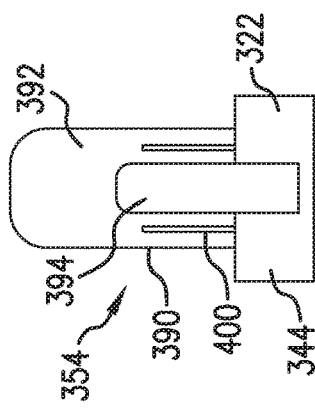
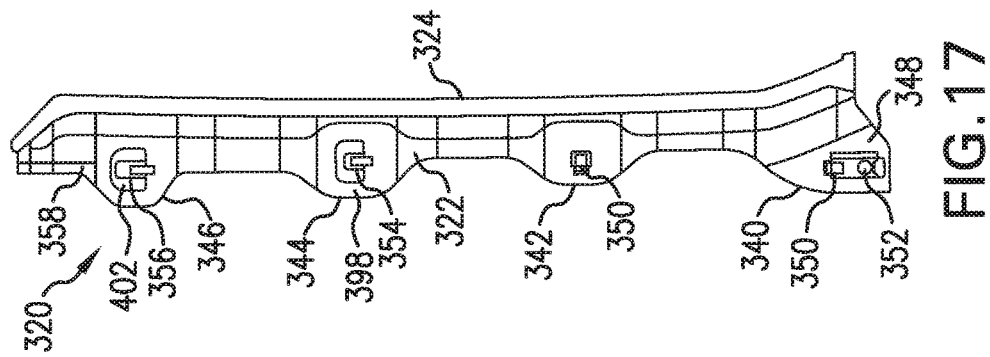

VEHICLE BODY ASSEMBLY

The present application is a division of U.S. patent application Ser. No. 15/383,438 filed Dec. 19, 2016, which claims priority to U.S. Prov. Pat. App. Ser. No. 62/276,497 filed Jan. 8, 2016, both of which are incorporated herein by reference.

BACKGROUND

Traditionally pickup trucks are body on frame with the load carrying bed and the passenger cabin separate from each other. For a pickup having a unibody, a one-piece side panel outer is applied such that there is no separation between the cabin and bed.

BRIEF DESCRIPTION

According to one aspect, a vehicle body assembly comprises a unibody frame having a rear frame part which defines a load carrying bed and rear fenders. The rear fenders are separate components which are configured to be fastened to a part of a main body component secured to the rear frame part. Each rear fender includes a plurality of stiffeners configured to provide strength and rigidity to the rear fender.

According to another aspect, a vehicle body assembly comprises a frame having a forward frame part defining a passenger cabin and a rear frame part defining a load carrying bed. A separate rear fender is removably fastened to the rear frame part, wherein a gap is provided between the forward frame part and the rear fender. A separate rear fender fairing is mounted to an inside surface of the rear fender. The rear fender fairing includes a seal located in the gap and sealingly engaging both the forward frame part and the rear fender.

According to yet another aspect, a vehicle body has a forward frame part defining a passenger cabin and a rear frame part defining a load carrying bed. A rear fender assembly for the vehicle body comprises a rear fender releasably mounted to the rear frame part, the rear fender including a body having a forward edge portion, a rearward edge portion, an upper edge portion and a lower edge portion, a first stiffener is secured to the body adjacent the forward edge portion and extends substantially vertically between the upper and lower edge portions; and a separate rear fender fairing mounted to the first stiffener of the rear fender, the rear fender fairing including an elongated body having spaced mounting locations arrayed along its length and a seal provided at an edge portion of the fairing body and extending along a length of the fairing body.

According to still yet another aspect, a method of assembling and painting a vehicle body comprises providing a vehicle frame; mounting a separate rear fender to a rear frame part of the vehicle frame; applying an electrodeposition coating to the vehicle frame with the rear fender mounted thereto; painting the vehicle frame with the rear fender mounted thereto; and installing a rear fender fairing having a seal provided thereon on the rear fender with the seal of the rear fender fairing sealingly engaging both the vehicle frame and the rear fender.

According to still yet another aspect, a method of assembling and painting a vehicle body comprises providing a unibody vehicle frame including a forward frame part including a passenger compartment and a rear frame part, removably securing a separate rear fender assembly to the rear frame part of the unibody vehicle frame, wherein the rear fender assembly partially defines a cargo box, applying an electrodeposition coating to the unibody vehicle frame with the rear fender assembly mounted thereto, and painting the unibody vehicle frame with the rear fender assembly mounted thereto. The rear fender assembly may be positioned on the unibody vehicle frame apart from the passenger compartment to define a gap therebetween.

Optionally, the method further comprises installing a rear fender fairing having a seal provided thereon on the rear fender assembly, wherein the seal of the rear fender fairing is positioned in the gap between the passenger compartment and the rear fender assembly when the rear fender assembly is removably secured to the rear frame part with the seal of the rear fender fairing sealingly engaging both the passenger compartment and the rear fender assembly.

Optionally, the method further comprises removing the rear fender assembly from the rear frame part, installing a rear fender fairing having a seal provided thereon on the rear fender assembly, and securing the rear fender assembly including the rear fender fairing to the rear frame part with the seal of the rear fender fairing positioned in the gap between the passenger compartment and the rear fender assembly and sealingly engaging both the passenger compartment and the rear fender assembly.

BRIEF DESCRIPTION OF THE DRAWINGS

FIGS. 16 and 17 are respective front and rear perspective views of the rear fender fairing.

FIGS. 20(A)-(D) are perspective views fasteners provided on the rear fender fairing and their corresponding features provided on the first stiffener of the rear fender.

FIG. 21 is a forward end portion of FIG. 5 sans the rear fender fairing.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 2:
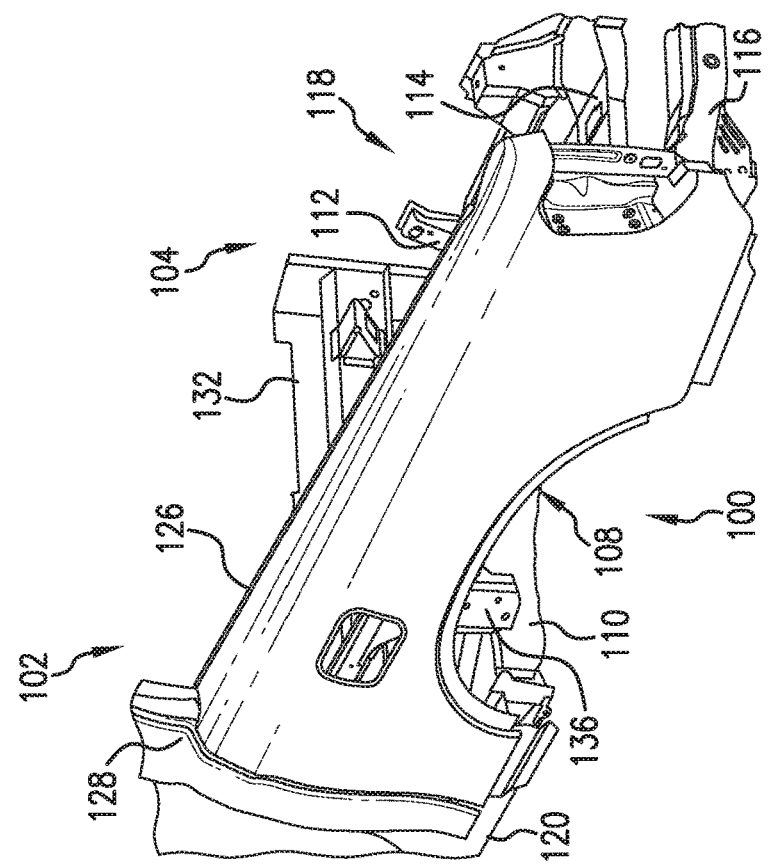
FIG. 2 is an assembled side perspective view of the vehicle body assembly of FIG. 1.
Figure 1:
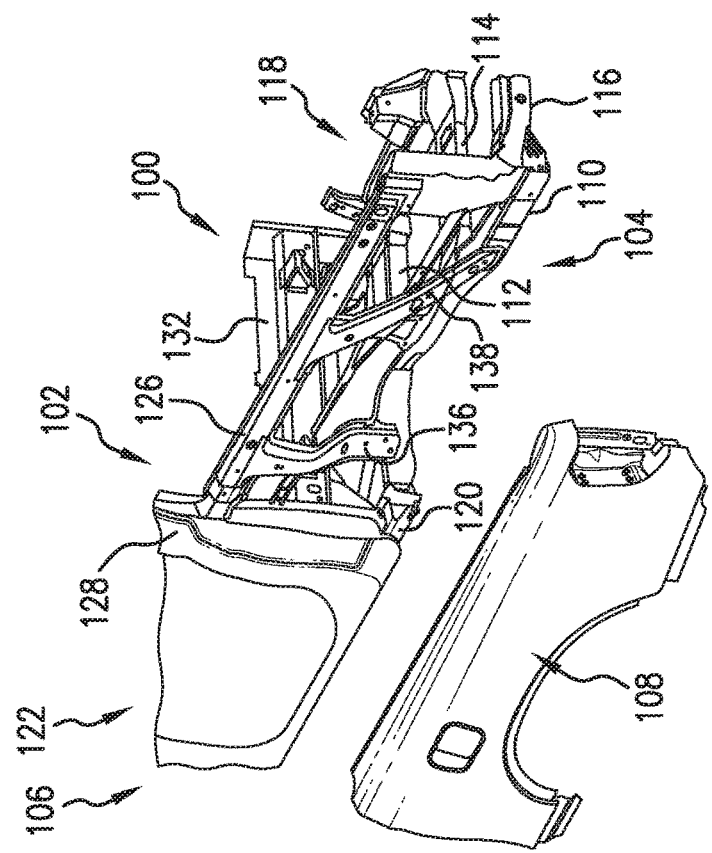
FIG. 1 is an exploded side perspective view of an exemplary vehicle body assembly including a rear fender adapted to be mounted to a vehicle frame.

Referring now to the drawings, wherein like numerals refer to like parts throughout the several views, FIGS. 1 and 2 illustrate an exemplary vehicle body assembly 100 comprising a unibody frame 102 having a rear frame part 104 (which defines a load carrying bed or cargo box 118) and a front frame part 106 (which defines a passenger compartment 122). Rear fender assemblies 108 (only one is depicted) are configured to be secured to the rear frame part 104 to at least partially define the cargo box 118. Each rear fender assembly 108 is a separate component of the vehicle body assembly 100. Such a configuration retains the benefits of the unibody frame 102 while simplifying repairs of any damage to the vehicle body assembly 100. For example, in the event damage is limited to the rear fender assembly 108, only the rear fender assembly 108 would have to be replaced as opposed to other components forming the cargo box 118 of the vehicle body assembly 100. However, because each rear fender assembly 108 is separate it provides a gap between a passenger cabin and the load carrying bed area similar to a body-on frame pickup truck that may detract from the overall appearance of the vehicle.

As depicted, the rear frame part 104 includes rear frame side members 110 and a plurality of cross braces 112, 114, 116 extending therebetween. The side frame members 110 extend from door frame members 120 of the front frame part 106 to the rear cross brace 116. The cross braces 112, 114, 116 include front cross brace 112, middle cross brace 114, and rear cross brace 116. The front and middle cross braces 112, 114 cooperate to define supports for the rear wheels and the rear suspension (not shown). The rear cross brace 116 extends between rear or distal ends of the side frame members 110. Upper rails 126 extend from respective rear cab pillars (C-pillars) 128 to rear bed pillars (D-pillars) 130, where the rear cab pillars 128 are formed at respective intersections between the door frame members 120 and a dividing wall 132. The upper rails 126 are each respectively supported by support beams 136, 138 extending from the rear frame side members 110 upward to the upper rails 126. The forward support beams 136 can be generally vertically oriented and can be generally perpendicular to the upper rails 126. The rear-diagonal support beams 138 can be diagonally oriented with respect to the upper rails 126. The door frame members 120 and the rear cab pillars 128 at least partially define the passenger compartment 122 of the front frame part 106.

It should be appreciated that in the vehicle longitudinal direction, the vehicle body assembly 100 on each of its lateral sides is of symmetrical design, so that only one of the rear fenders 108 will be described in detail. With reference to FIGS. 3-6, the separate rear fender 108 includes a body 140 having a forward edge portion 142, a rearward edge portion 144, an upper edge portion 146, and a lower edge portion 148. A first stiffener 152 is secured to the body 140 adjacent the forward edge portion 142 and extends substantially vertically between the upper and lower edge portions 146, 148. As shown, the first stiffener 152 is shaped along its length to conform to the body 140. According to one aspect, the first stiffener 152 can be U-shaped in cross-section with opposed sides 154 of the first stiffener provided with mounting flanges 156. The first stiffener 152 is directly secured (e.g., welded) to the body 140, and a weld sealer can be provided at an interface between the mounting flanges 156 of the first stiffener 152 and body 140. A first supplemental stiffener 160 is secured to a lower end portion 162 of the first stiffener 152 adjacent the lower edge portion 148. According to the embodiment of FIG. 3, the first supplemental stiffener 160 is located at least partially on a forward mounting flange 164 of the lower edge portion 148. A second stiffener 170 is secured to the body 140 adjacent the rearward edge portion 144 and extends substantially vertically between the upper and lower edge portions 146, 148. According to one aspect, the second stiffener 170 can be U-shaped in cross-section with opposed sides 174 of the second stiffener provided with mounting flanges 176. Similar to the first stiffener 152, the second stiffener 170 is directly secured (e.g., welded) to the body 140, and a weld sealer can be provided at an interface between the mounting flanges 176 of the second stiffener 170 and the body 140.

Figure 4:
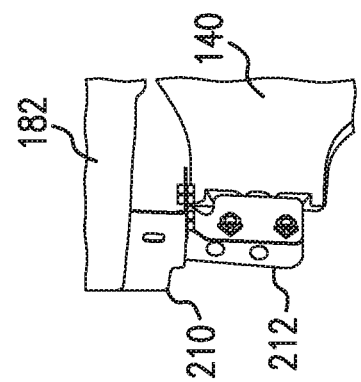
FIG. 4 is an enlarged side perspective view of a rearward lower corner of the rear fender of FIG. 3.
Figure 6:
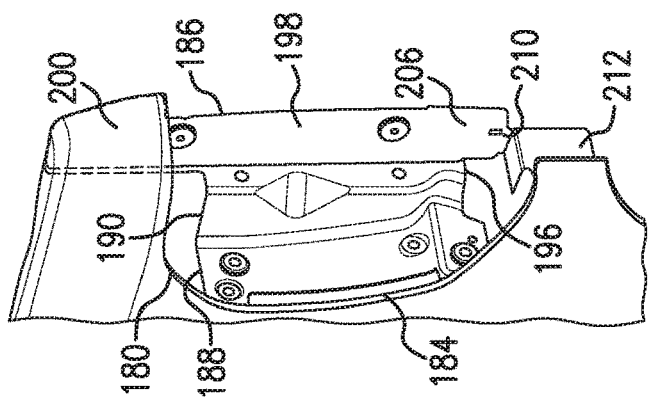
FIG. 6 is an enlarged side perspective view of a rearward edge portion of the rear fender of FIG. 5.
Figure 5:
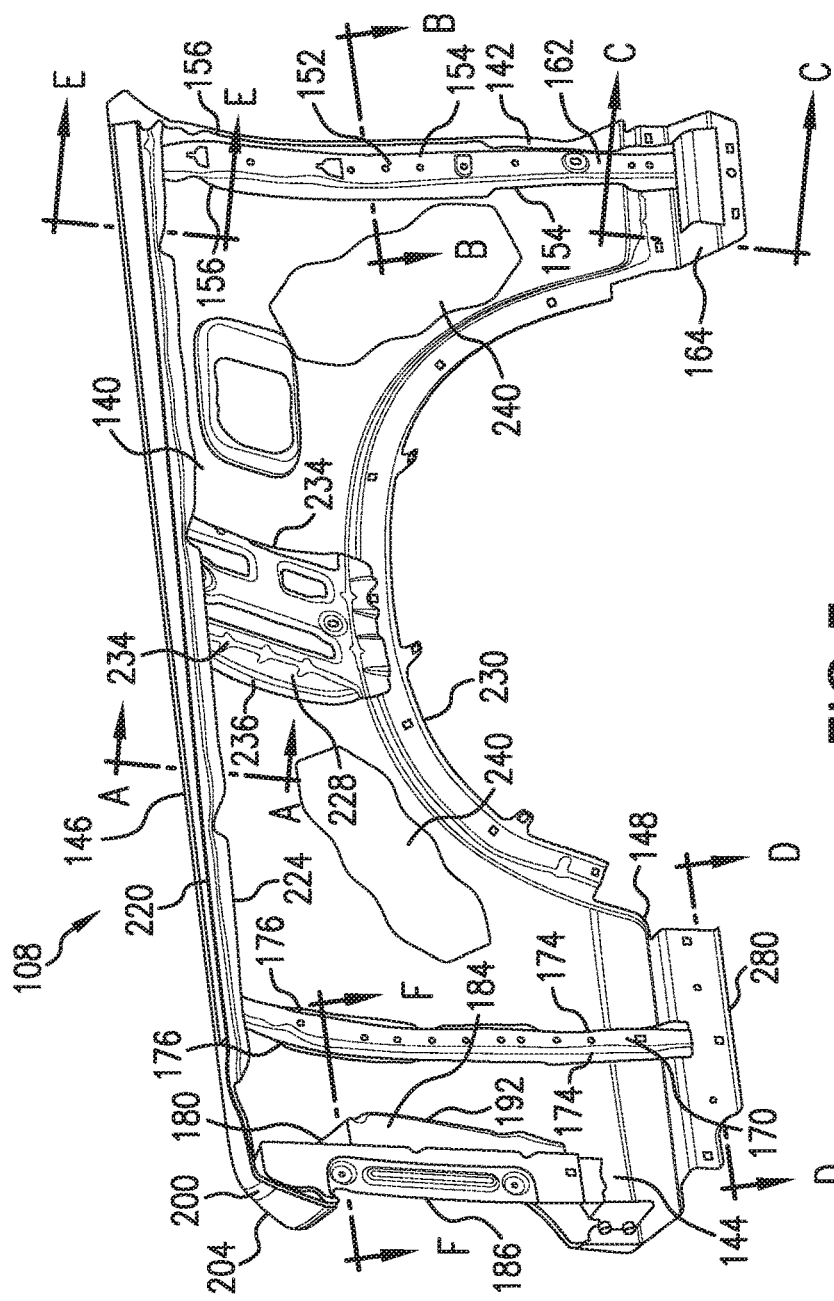
FIG. 5 is another rear perspective view of the rear fender of FIG. 1.

As best depicted in FIGS. 5 and 6, the rearward edge portion 144 includes a cutout 180, and secured to the body 140 of the rear fender 108 at the location of the cutout 180 is a second supplemental stiffener 182. This second supplemental stiffener 182 includes a first portion 184 and a second portion 186. The first portion 184 can be substantially L-shaped and includes a first wall 188 and a first base 190. The first wall 188 is shaped to conform to an edge 192 of the body 140 defining the cutout 180 and extends inwardly (i.e., laterally) from the body 140. The first base 190 extends rearward (i.e., longitudinally) from the first wall 188. The second portion 186 can also be substantially L-shaped and includes a second wall 196 extending inwardly from the first base 190 and a second base 198. The second base 198 includes an upper end portion 200 shaped to conform to an upper rearward corner 204 of the body 140. Provided at a lower end portion 206 of the second base 198 is a pair of gutters 210, 212. The first gutter 210 can be secured directly to the lower end portion 206 and the second gutter 212 is secured to and extends inwardly from the body 140. FIG. 4 depicts the first and second gutters 210, 214 as being separate from one another; however, FIG. 6 depicts another aspect with the first and second gutters 210, 212 being integrally formed to define a unitary member.

Figure 3:
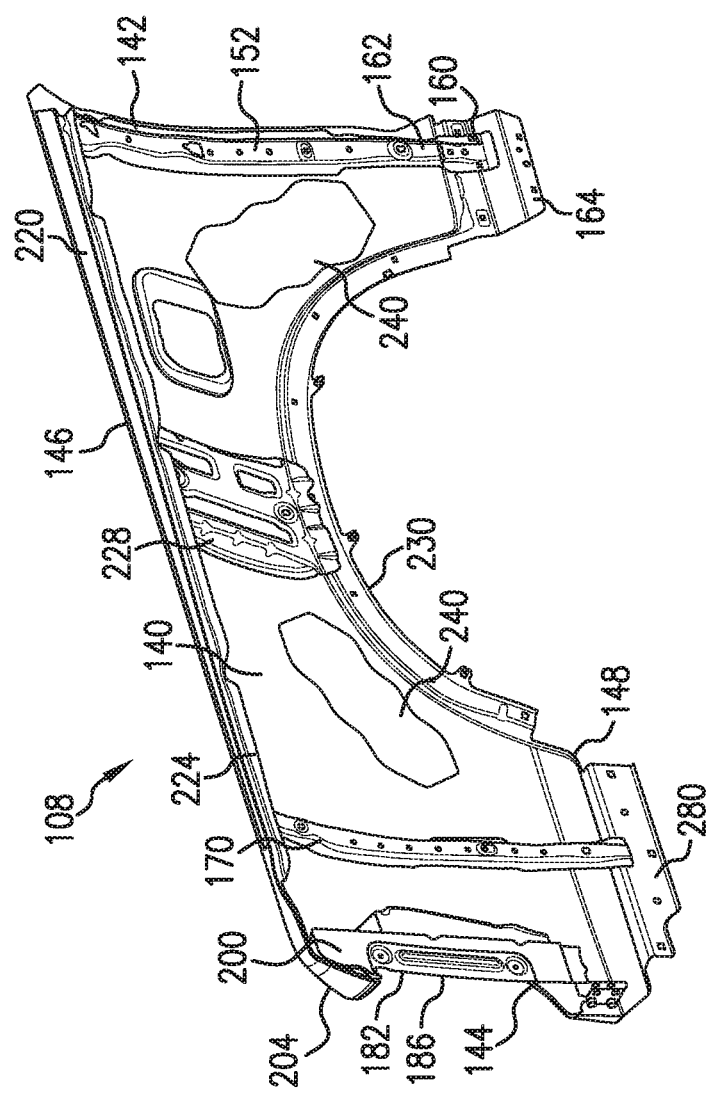
FIG. 3 is a rear perspective view of the rear fender of FIG. 1.

The upper edge portion 146 of the rear fender body 140 includes an inwardly (i.e., laterally) extending upper mounting flange 220, and provided beneath the upper mounting flange 220 is a longitudinally extending third stiffener 224, which in the depicted embodiment of FIG. 3 extends between the forward and rear edge portions 142, 144. A fourth stiffener 228 extends substantially vertical between the third stiffener 224 and a fender section 230 of lower edge portion 148. According to one aspect, the fourth stiffener 228 can be U-shaped in cross-section with opposed sides 234 of the fourth stiffener provided with mounting flanges 236. Similar to the previously described stiffeners 152, 170, the fourth stiffener 228 is directly secured (e.g., welded) to the body 140, and again a weld sealer can be provided at an interface between the mounting flanges 236 of the fourth stiffener 228 and the body 140. To further add strength to the rear fender 108, tape stiffeners 240 can be adhered to the body 140 near the fender section 230 of lower edge portion 148.

According to the present disclosure, the body 140 of the rear fender 108 can be formed from a first metal, each of the stiffeners 152, 160, 170, 182, 228 and gutters 210, 212 can be formed of a second differing metal, and the stiffener 224 can be formed of a third differing metal. By way of example, the body 140 can be formed of a galvannealed (cold rolled base) EDDS Extra Deep Drawing steel, the stiffeners can be formed of a galvannealed (cold rolled base) commercial steel, and the stiffener can be formed of a galvannealed (cold rolled base) dual phase 85.6 ksi Min Tensile steel. However, it should be appreciated that various alternative metals for the above described components of the rear fender 108 are contemplated.

The exemplary rear fender 108 is separately attached to a part of a main body structure of the vehicle (which is secured to the frame 102) via fastening devices after the main body structure is completed. By way of example, each fastening device is a bolt 250; however, the fastening devices may be any type of mechanical fastening device commonly known in the art that allows for the rear fender 108 to be easily detached from the frame 102. The fastened (e.g., bolt-on) rear fender 108 is then painted with the rest of the vehicle body assembly 100, and in case of damage to the rear fender 108 it can be replaced without replacing the entire bed structure required for a body on a traditional frame pickup truck.

Figure 7:
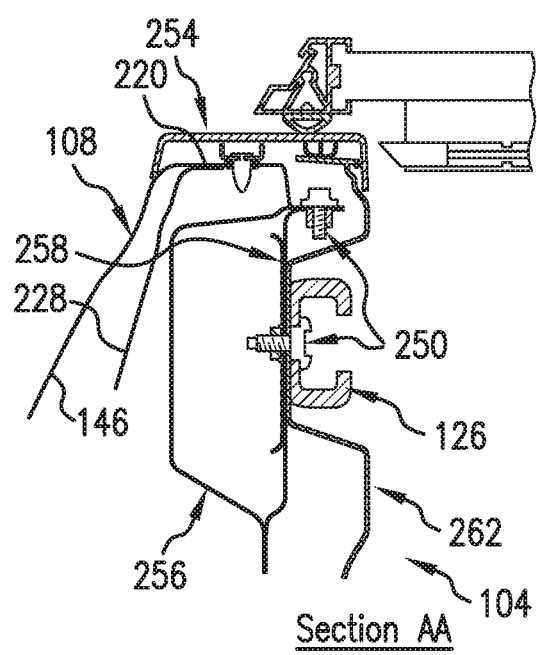
FIGS. 7-12 are cross-sectional views of the vehicle body assembly taken along the depicted reference lines of FIG. 5.
Figure 8:
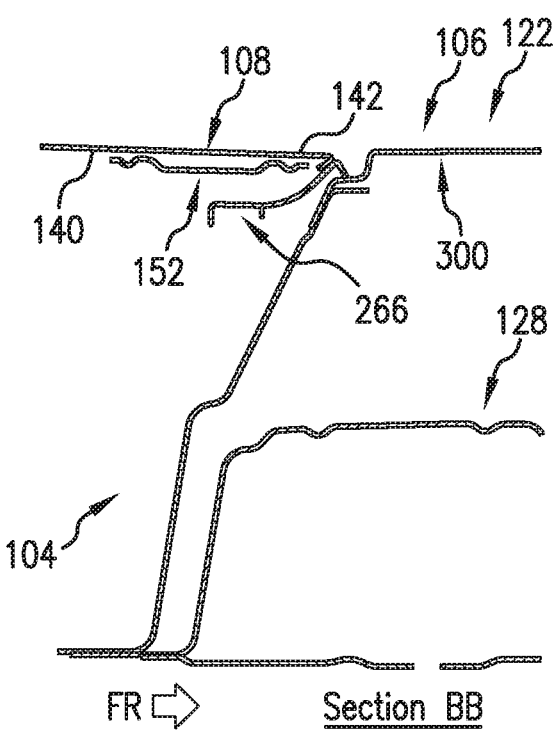
Figure 9:
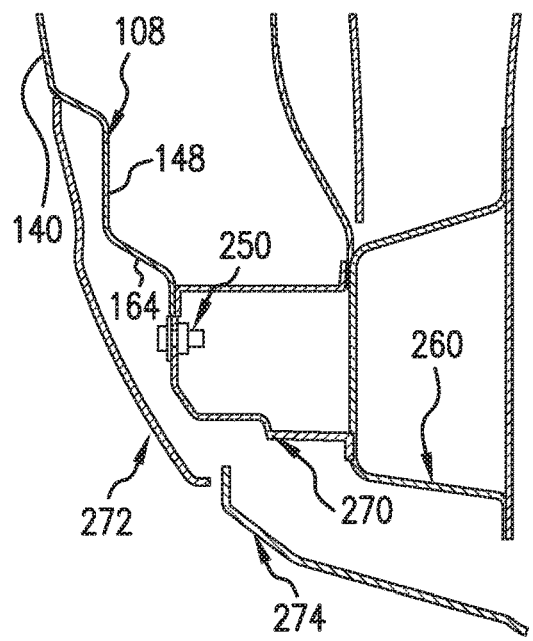
Figure 10:
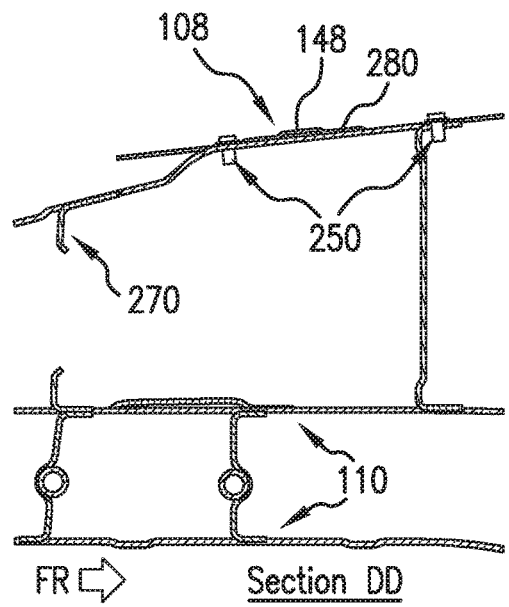
Figure 11:
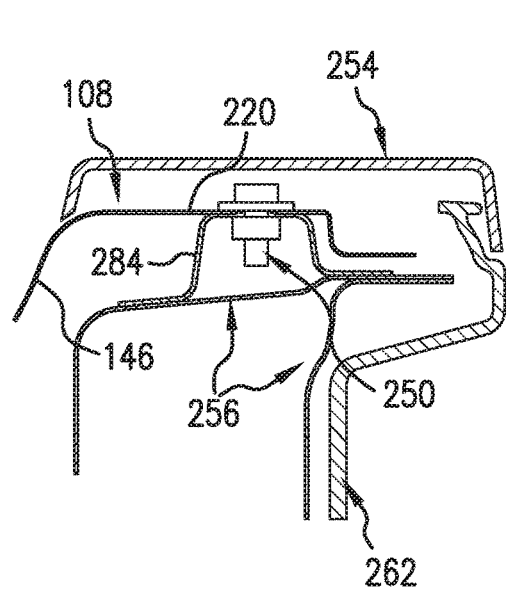
Figure 12:
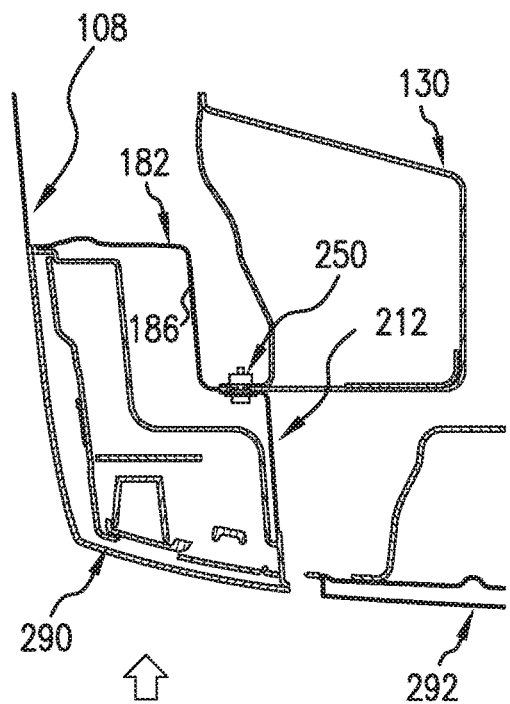

FIGS. 7-12 illustrate the bolt-on connection of the rear fender 108 to the rear frame part 104. In FIG. 7, a bed rail garnish 254 is fastened to the upper mounting flange 220 of the upper edge portion 146 of the rear fender body 140. The upper mounting flange 220 is further fastened to the upper rail 126 of the rear frame part 104 which itself is part of the unibody frame 102. A bed rail 256 is fastened to the upper rail 126 and a rear inner stiffener 258 with a fastener 250. A side lining 262 is provided between the bed rail 256 and the upper rail 126. In FIG. 8, a rear fender fairing 266 is provided at a gap between the forward edge portion 142 of the rear fender body 140 and that part of the front frame part 106 that defines the passenger compartment 122. FIG. 9 depicts the lower edge portion 148, particularly the forward mounting flange 164 of the lower edge portion 148, of the rear fender body 140 fastened to a rear fender stay 270. The rear fender stay 270 is mounted to a rear inner member 260. A fender protector 272 is secured to the lower edge portion 148 of the rear fender body 140 and a side sill garnish 274 is provided adjacent the fender protector 272. FIG. 10 depicts a rearward mounting flange 280 of the lower edge portion 148 fastened to the rear fender stay 270, which is secured to a rear frame side member 110. In FIG. 11, the upper mounting flange 220 of the upper edge portion 146 is fastened to a support 284 of the bed rail 256. Finally, FIG. 12 depicts the second supplemental stiffener 182 fastened to the D-pillar 130 of the vehicle frame 102 and a tail light 290 secured to the second gutter 212, which itself can be fastened to the D-pillar 130. A portion of a tail gate 292 is also depicted.

Figure 13:
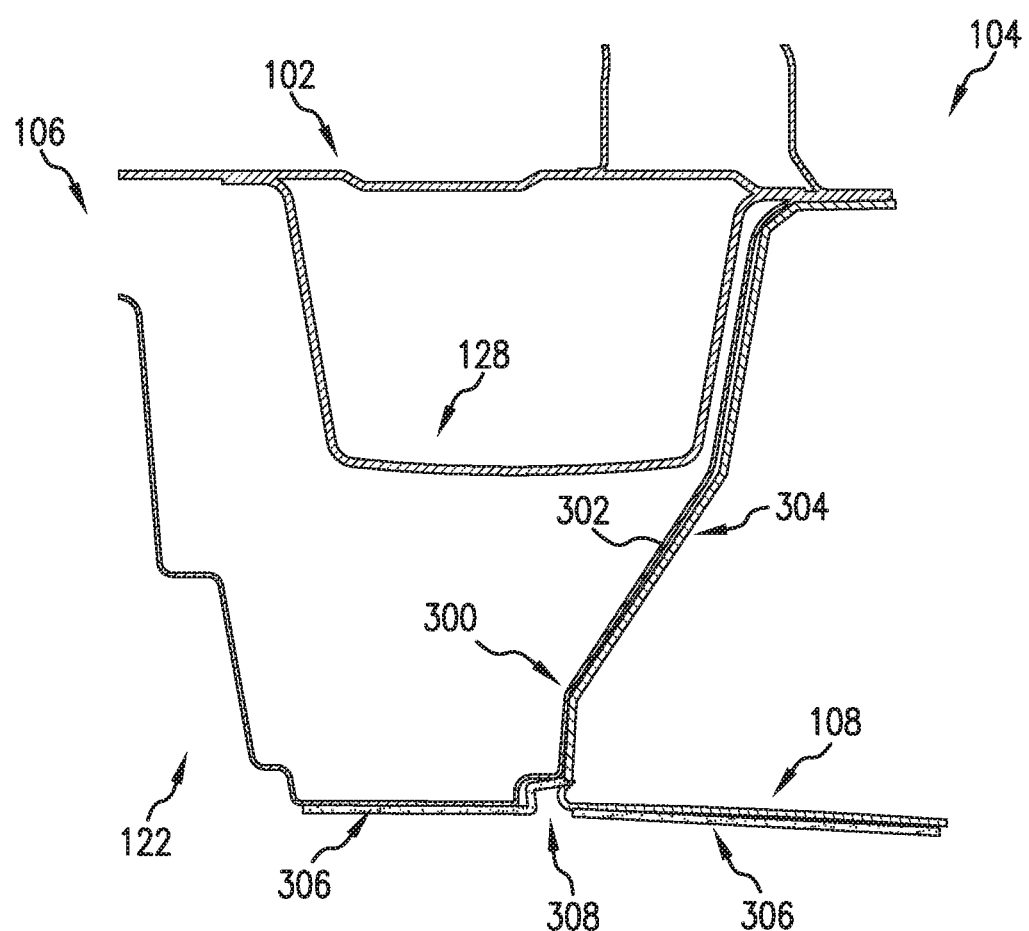
FIG. 13 is a cross-sectional view of the vehicle body assembly of FIG. 2 sans an exemplary rear fender fairing adapted to be mounted to the rear fender.

With body-on frame pickup trucks the passenger compartment (or cabin) and the load carrying bed area are painted separately, which can result in different coloring of each. The exemplary vehicle body assembly 100 includes the unibody frame 102 and the separate rear fender 108 secured thereto so that each can be painted simultaneously, thereby avoiding color mismatches. As shown in FIG. 13, a side panel outer 300 is secured to the door frame member 120 of the frame 102 adjacent the rear fender 108 which at least partially covers a rear part 302 of the side panel outer 300. During assembly an electrodeposition coating (so-called ED coating) 304 is applied to frame 102 together with the side panel outer mounted thereto. The electrodeposition coating 304 is a base coating, and a finish coating 306 of paint for decorative purposes is thereafter applied to the vehicle body assembly 100. The rear fender 108 is secured to the frame 102 and painted at the same time as the rest of the vehicle to improve color matching. However, because paint may not enter a gap 308 provided between the side panel outer 300 and the rear fender 108, the electrodeposition coating 304 provided on the rear part 302 may be exposed to ultraviolet (UV) light via the gap 308. Further, paint build up or exposed welds in the gap 308 can provide an uneven appearance to the consumer.

Figure 18:
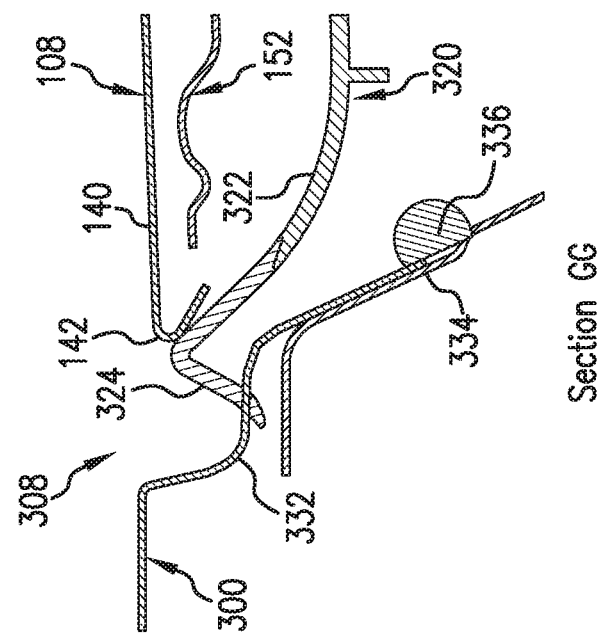
FIGS. 18 and 19 are cross-sectional views taken along line G-G of FIG. 14.
Figure 14:
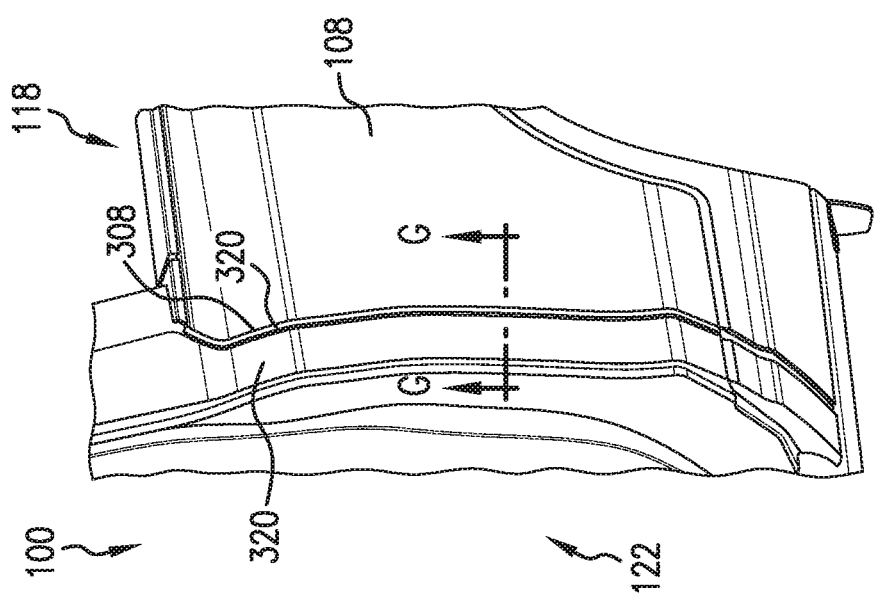
FIG. 14 is a side perspective view of the vehicle body assembly with the rear fender fairing installed on the rear fender.
Figure 15:
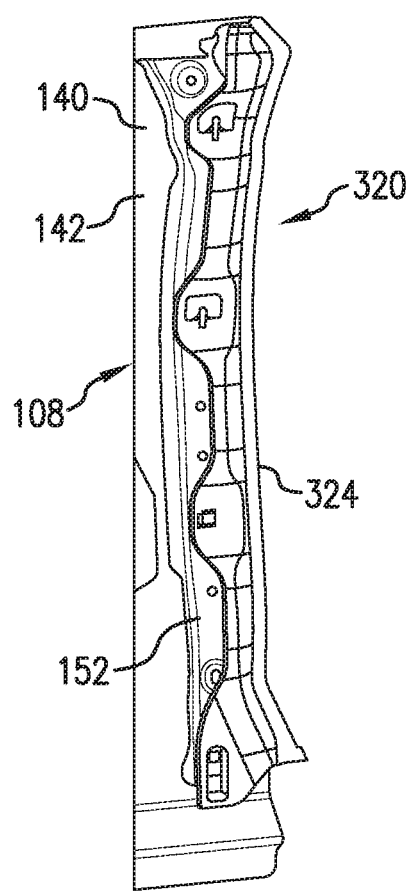
FIG. 15 is a rear partial perspective view of the rear fender fairing mounted to a first stiffener provided on the rear fender.
Figure 19:
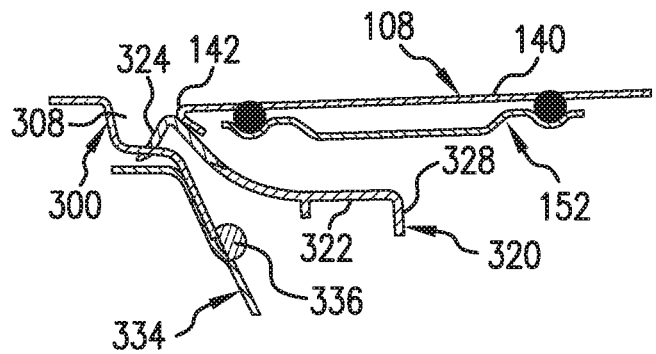

With reference to FIGS. 14-17, an exemplary rear fender fairing 320 is mounted to the rear fender 108 to seal the gap between the rear fender 108 and the passenger compartment 122. The rear fender fairing 320, which can be a dual mold injection part, includes an elongated body 322 configured to be mounted the first stiffener 152 provided at the forward edge portion 142 of the rear fender body 140. A seal 324 comprising a less rigid material than the body 322 is secured to one edge portion 326 of the body 322 and an inwardly (i.e., laterally) extending flange 328 is located at the opposite edge portion 330 of the body 322. FIGS. 18 and 19 depict the first fender fairing 320 in its installed condition with respect to the rear fender 108 and the side panel outer 300. The seal 324, which can have an inverted V-shape, is located in the gap 308 and sealingly engages both the forward edge portion 142 of the rear fender 108 and an inwardly step portion 332 of the side panel outer 300. Further depicted is a side panel outer extension 334 attached to (e.g., welded to) the side panel outer 300 with a dust sealer 336 applied at an interface between the side panel outer 330 and the extension 334.

Figure 16:
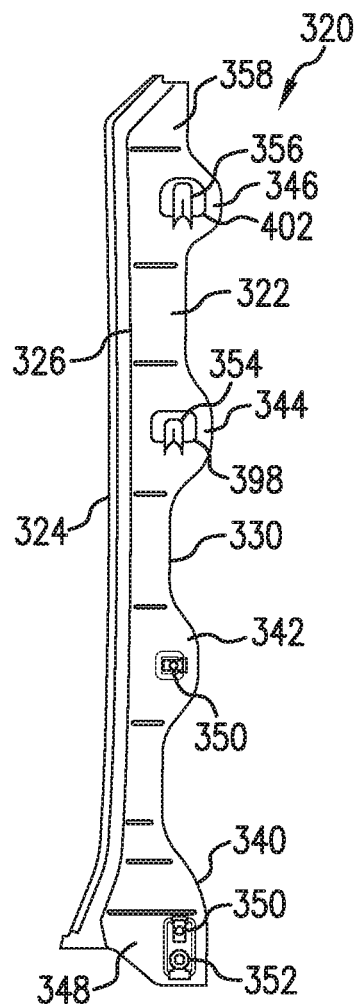

With reference to FIGS. 16 and 17, the body 322 includes spaced mounting locations 340, 342, 344, 346 arrayed along its length, each mounting location provided with a fastener adapted to engage the first stiffener 152. Particularly, the first mounting location 340 is at a lower end portion 348 of the body 322 and includes a first fastener 350 and a second fastener 352. The second mounting location 342 is located above the first mounting location 340 and includes another first fastener 350. The third mounting location 344 is located above the second mounting location 342 and includes a third fastener 354. And the fourth mounting location 346 includes a fourth fastener 356 and is provided at an upper end portion 358 of the body 322. According to one aspect, the first fastener 350 is a clip, the second fastener 352 is a nut, and each of the third fastener 354 and fourth fastener 356 is a hook. However, it is to be understood that the present disclosure is not limited to any single fastener or combination of fasteners. In a non-limiting example, each attachment location could either be a clip, hook, bolt, or nut. FIGS. 20(A)-(C) depict each of the fasteners and FIGS. 20(D) and 21 depict engagement locations for each of the fasteners on the first stiffener 152 and height (H) and longitudinal (T) datum locations.

Figure 22:
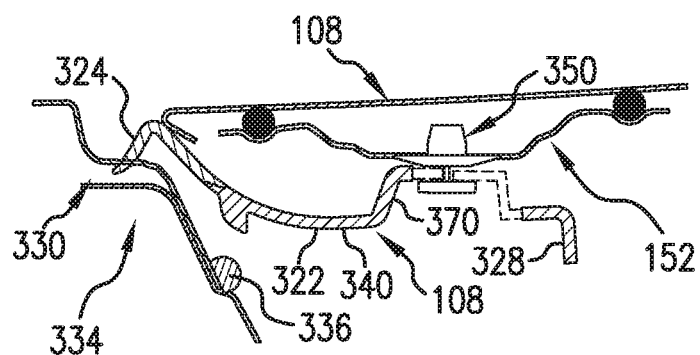
FIGS. 22 and 23 are further cross-sectional views of the exemplary vehicle body assembly.
Figure 23:
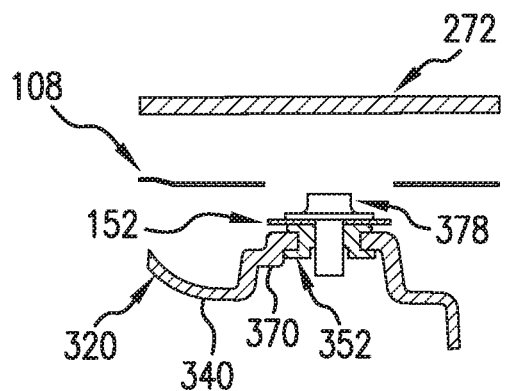
Figure 25B:
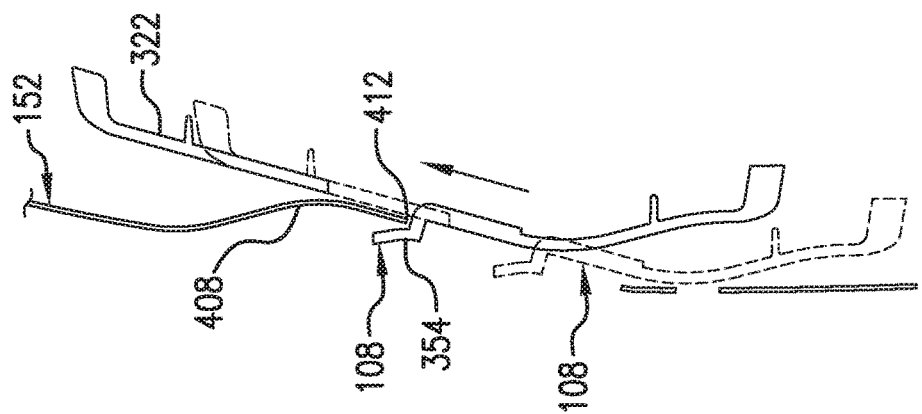
FIGS. 25(A)-(B) are cross-sectional views taken along line H-H of FIG. 24(B).
Figure 25A:
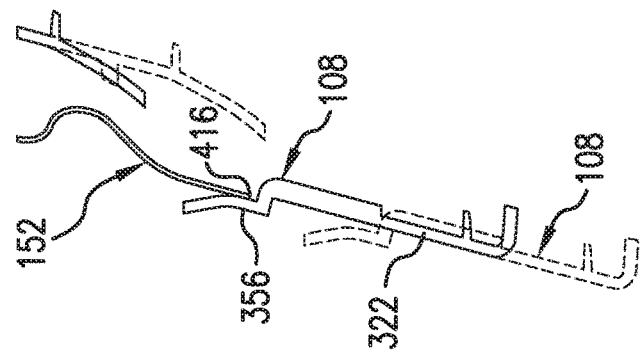
Figure 24B:
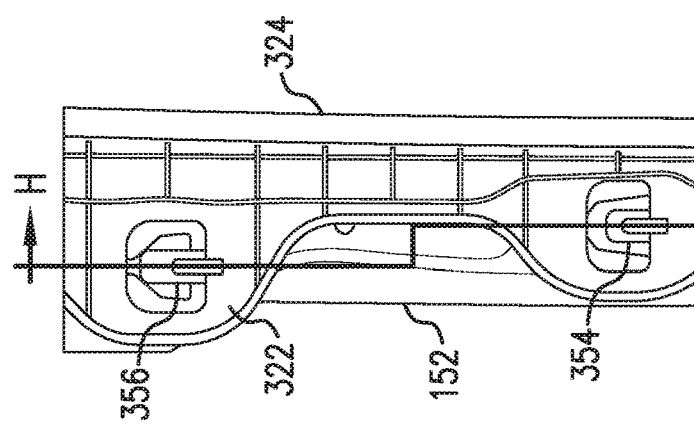
FIGS. 24(A)-(B) are inner perspective views of the rear fender fairing in an initial contact condition with the first stiffener and in an installed condition on the first stiffener.
Figure 24A:
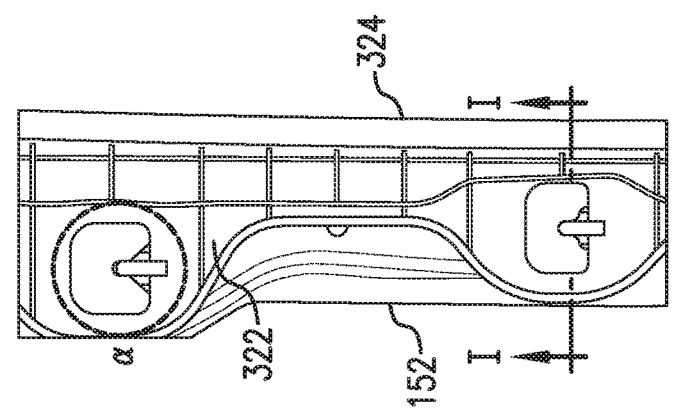
Figure 26:
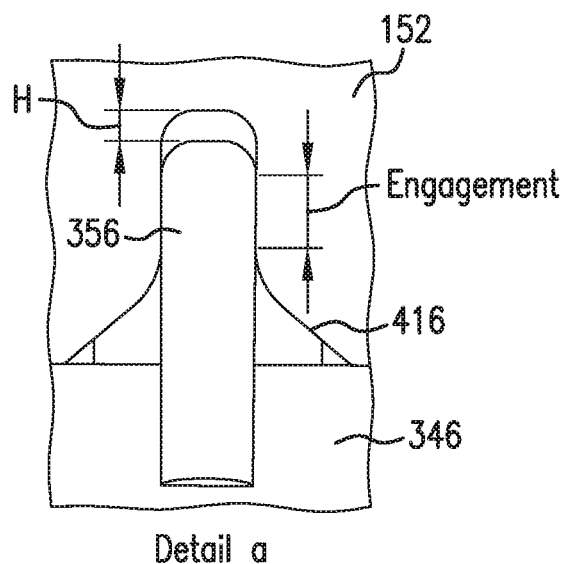
FIG. 26 is a detail view of one of the fasteners in FIG. 24(A).
Figure 27:
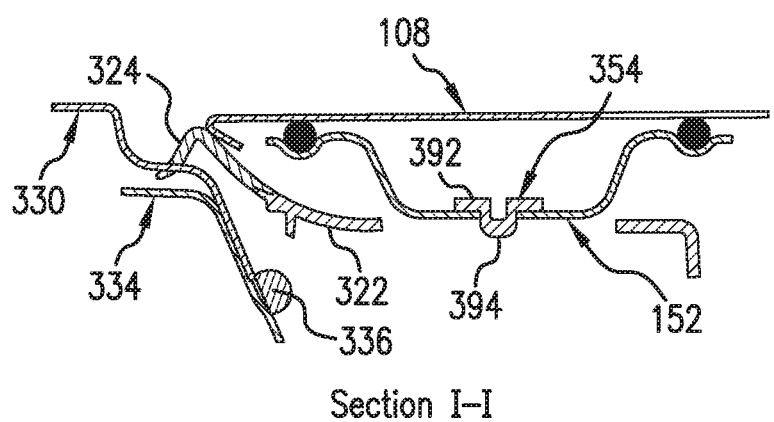
FIG. 27 is a cross-sectional view taken along line I-I of FIG. 24(A).

As shown in FIG. 20(A), a recessed region 370 (which projects laterally outwardly) is located on the body 322 at the first mounting location 340 and includes upper and lower cutouts 372, 374. The clip 350 is secured to the recessed region 370 at the upper cutout 372 and the nut 352 is secured to the recessed region 370 at the lower cutout 374. FIG. 22 depicts the clip 350 at the first mounting location 340 mounted to the first stiffener 152, and FIG. 23 depicts a bolt extending through an opening in the first stiffener 152 and threadingly engaging the nut 352. The fender protector 272 conceals the bolt 378 from the exterior. Similarly, in FIG. 20(B) a recessed region 380 is located on the body 322 at the second mounting location 342 and includes a cutout 382. Another clip 350 is secured to the recessed region 380 at the cutout 382. However, this clip 350 is installed in a longitudinally engaging position as compared to the clip 350 at the first mounting location 340 which is installed in a vertically engaging position. The orientation of the clip 350 at the second mounting location 342 can serve as a height (H) datum for the mounting of the rear fender fairing 320 to the first stiffener 152.

The features the hook 354 are best depicted in FIG. 20(C). The hook 354 includes a body 390 having a first section 392 and a second section 394 at least partially located on both the first section 392 and the body 322. The body 390 projects into a cutout 398 at the third mounting location 344 of the body 322 (FIGS. 16 and 17). Tuning ribs 400 can be provided on the first section 392 of the body 390 for lateral control of the installed rear fender fairing 320. According to one aspect, the tuning ribs 400 flank the second section 394. It should be appreciated that the hooks 354, 356 are similarly constructed, the hook 356 projecting into a cutout 402 at the fourth mounting location 346 of the body 322. FIGS. 24-27 depict the installation of the hooks 354, 356 of the rear fender fairing 320 to the first stiffener 152. Regarding the hook 354, the first section 392 is configured to extend outwardly (i.e., laterally) through the cutout 398 such that in the installed condition of the rear fender fairing 320 the first section 392 engages a side 408 of the first stiffener 152 facing the rear fender body 140. The second section 394 is adapted to be received in a slotted section 410 of a hook receiving opening 412 located on the first stiffener 152. The slotted section 410 can be oversized in the height (H) direction to allow for ease of assembly of the rear fender fairing 320. The hook 356 is received in a similarly shaped hook receiving opening 416 located on the first stiffener 152.

In the installed condition of the rear fender fairing 320 on the first stiffener 152, the seal 324 is located in the gap 308 between the rear fender 108 and the side panel outer 300. The seal 322 prevents UV light from compromising the exposed electrodeposition coating 304 provided on the rear part 302 of the side panel outer 300. In production of the vehicle body assembly 100, the side panel outer 300 is attached to the frame 102, and the electrodeposition coating 304 is applied to this sub-assembly. The rear fender 108 is then bolted on the frame 102 for painting with the rest of the vehicle. The rear fender 108 can then be removed from the frame 102 for installation of the rear fender fairing 320. Once mounted to the first stiffener 152, the rear fender 108 together with the rear fender fairing 320 can then be bolted back onto the frame 102.

As is evident from the foregoing, the present disclosure provides an exemplary method of assembling and painting a vehicle body. The method comprises providing a vehicle frame; mounting a separate rear fender to a rear frame part of the vehicle frame; applying an electrodeposition coating to the vehicle frame with the rear fender mounted thereto; painting the vehicle frame with the rear fender mounted thereto; and installing a rear fender fairing having a seal provided thereon on the rear fender with the seal of the rear fender fairing sealingly engaging both the vehicle frame and the rear fender.

The method further comprises securing a side panel outer to the vehicle frame prior to the application of the electrodeposition coating, and positioning the seal in a gap between the side panel outer and the rear fender with the seal sealingly engaging both the side panel outer and the rear fender. The method further comprises attaching a stiffener on an inner surface of the rear fender, and installing the rear fender fairing on the stiffener.

The present disclosure provides another exemplary method of assembling and painting a vehicle body. The method comprises providing a unibody vehicle frame including a forward frame part including a passenger compartment and a rear frame part; removably securing a separate rear fender assembly to the rear frame part of the unibody vehicle frame, wherein the rear fender assembly partially defines a cargo box; applying an electrodeposition coating to the unibody vehicle frame with the rear fender assembly mounted thereto; and painting the unibody vehicle frame with the rear fender assembly mounted thereto. The rear fender assembly may be positioned on the unibody vehicle frame apart from the passenger compartment to define a gap therebetween.

Optionally, the exemplary method further comprises installing a rear fender fairing having a seal provided thereon on the rear fender assembly, wherein the seal of the rear fender fairing is positioned in the gap between the passenger compartment and the rear fender assembly when the rear fender assembly is removably secured to the rear frame part with the seal of the rear fender fairing sealingly engaging both the passenger compartment and the rear fender assembly.

Optionally, the exemplary method further comprises removing the rear fender assembly from the rear frame part, installing a rear fender fairing having a seal provided thereon on the rear fender assembly, and securing the rear fender assembly including the rear fender fairing to the rear frame part with the seal of the rear fender fairing positioned in the gap between the passenger compartment and the rear fender assembly and sealingly engaging both the passenger compartment and the rear fender assembly.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of assembling and painting a vehicle body comprising:
   providing a unibody vehicle frame including a forward frame part including a passenger compartment and a rear frame part;
   removably securing a separate rear fender to the rear frame part of the unibody vehicle frame, wherein the rear fender partially defines a cargo box;
   applying an electrodeposition coating to the unibody vehicle frame with the rear fender mounted thereto; and
   painting the unibody vehicle frame with the rear fender mounted thereto,
   wherein the rear fender is removably secured to the rear frame part apart from the passenger compartment to define a gap therebetween, and
   the method further comprises installing a rear fender fairing having a seal provided thereon on the rear fender, wherein the seal of the rear fender fairing is positioned in the pap between the passenger compartment and the rear fender when the rear fender is removably secured to the rear frame part with the seal of the rear fender fairing sealingly engaging both the passenger compartment and the rear fender.

2. The method of claim 1, further comprising securing a side panel outer to the passenger compartment prior to the application of the electrodeposition coating, and positioning the seal in the gap between the side panel outer and the rear fender when the rear fender is removably secured to the rear frame part with the seal sealingly engaging both the side panel outer and the rear fender.

3. The method of claim 1, wherein the rear fender includes a stiffener on an inner surface of the rear fender, and installing the rear fender fairing on the rear fender comprises securing the rear fender fairing on the stiffener.

4. The method of claim 1, wherein the rear fender fairing is installed on the rear fender after painting and while the rear fender is removably secured to the rear frame part.

5. The method of claim 1, further comprising removing the rear fender from the rear frame part, installing the rear fender fairing on the rear fender, and securing the rear fender including the rear fender fairing to the rear frame part.

6. The method of claim 5, wherein the rear fender fairing is installed on the rear fender after painting.

7. A method of assembling and painting a vehicle body comprising:
   providing a vehicle frame having a forward frame part defining a passenger cabin and a rear frame part defining a load carrying bed;
   removably securing a separate rear fender to the rear frame part of the vehicle frame;
   securing a side panel outer to the forward frame part to provide a gap between the side panel outer and the rear fender, the gap defining a separation between the passenger cabin and the load carrying bed;
   applying an electrodeposition coating to the vehicle frame with both the side panel outer and the rear fender mounted thereto;
   painting the vehicle frame with both the side panel outer and the rear fender mounted thereto; and
   installing a rear fender fairing on the rear fender after painting to cover a part of the vehicle frame exposed by the gap.

8. The method of claim 7, wherein the rear fender includes a stiffener on an inner surface of the rear fender, and installing the rear fender fairing on the rear fender comprises securing the rear fender fairing on the stiffener.

9. The method of claim 8, wherein a portion of the rear fender fairing is extended forward from a forward edge portion of the rear fender, and locating the portion of the rear fender fairing in the gap.

10. The method of claim 9, wherein the portion of the rear fender fairing includes a seal sealingly engaging both the side panel outer and the rear fender.

11. The method of claim 8, wherein the rear fender fairing includes spaced mounting locations arrayed along its length, each mounting location provided with a fastener, and fastening the rear fender fairing to the stiffener.

12. The method of claim 7, wherein the vehicle frame is a unibody frame, and further comprising positioning a seal in the gap between side panel outer and the rear fender after painting the vehicle frame.

13. A method of assembling and painting a vehicle body comprising:
   providing a unibody vehicle frame having a forward frame part defining a passenger cabin and a rear frame part defining a load carrying bed;
   removably securing a separate rear fender to the rear frame part of the unibody vehicle frame;
   securing a side panel outer to the forward frame part to provide a gap between the side panel outer and the rear fender, the gap defining a separation between the passenger cabin and the load carrying bed;
   applying an electrodeposition coating to the unibody vehicle frame with both the side panel outer and the rear fender mounted thereto; and
   painting the unibody vehicle frame with both the side panel outer and the rear fender mounted thereto; and
   installing a rear fender fairing on a forward edge portion of the rear fender.

14. The method of claim 13, further comprising locating a portion of the rear fender fairing in the gap to cover a part of the unibody vehicle frame exposed by the gap.

15. The method of claim 14, wherein the rear fender includes a stiffener on an inner surface of the rear fender, and installing the rear fender fairing on the rear fender comprises securing the rear fender fairing on the stiffener.

16. The method of claim 13, wherein the rear fender fairing is installed on the rear fender after painting and while the rear fender is removably secured to the rear frame part.

17. The method of claim 13, further comprising removing the rear fender from the rear frame part, installing the rear fender fairing on the rear fender, and securing the rear fender including the rear fender fairing to the rear frame part.

\* \* \* \* \*